United States Patent
McKenzie

Patent Number: 5,950,489
Date of Patent: Sep. 14, 1999

[54] VARIABLE GEOMETRY LINKAGE CONFIGURATION

[75] Inventor: Thomas A. McKenzie, Spring Lake, Mich.

[73] Assignee: Neway Anchorlok International, Inc., Muskegon, Mich.

[21] Appl. No.: 09/085,567

[22] Filed: May 27, 1998

Related U.S. Application Data

[63] Continuation of application No. PCT/US97/17625, Oct. 2, 1997
[60] Provisional application No. 60/027,348, Oct. 2, 1996.

[51] Int. Cl.$^6$ .................................................. F16D 3/33
[52] U.S. Cl. .................... 74/110; 267/256; 180/89.15; 296/190.07; 248/564
[58] Field of Search ........................ 74/110; 267/256, 267/131; 180/89.15, 89.13, 89.12; 296/190.01, 190.07; 248/564, 585, 586, 588, 589

[56] References Cited

U.S. PATENT DOCUMENTS

| | | | |
|---|---|---|---|
| 4,275,918 | 6/1981 | Franco | 296/190 |
| 4,610,461 | 9/1986 | Guzzetta . | |
| 4,807,713 | 2/1989 | Smith et al. | 180/89.14 |
| 4,989,684 | 2/1991 | Conaway | 180/89.15 |
| 5,109,939 | 5/1992 | Conaway et al. | 180/89.15 |
| 5,253,853 | 10/1993 | Conaway et al. . | |
| 5,653,146 | 8/1997 | Barton . | |

FOREIGN PATENT DOCUMENTS

| | | |
|---|---|---|
| 0 426 510 A1 | 5/1991 | European Pat. Off. . |
| 649 241 | 5/1985 | Switzerland . |

Primary Examiner—Thomas R. Hannon
Assistant Examiner—David Fenstermacher
Attorney, Agent, or Firm—Rader, Fishman, Grauer & McGarry

[57] ABSTRACT

A variable geometry linkage configuration for use between a support structure and suspended body comprises a link member having first and second ends, a first pivotal interconnection for pivotally interconnecting the first end of the link member with a support plate for rotation about a support pivot axis of rotation. A lever member is provided which has a longitudinal axis and first and second ends. A second pivotal interconnection for pivotally interconnecting the first end of the lever member with an impact plate for rotation about a main pivot axis of rotation. A shock pivot is mounted to the lever member and is adapted to connect an end of a shock absorber to the lever member for rotation about a shock pivot axis of rotation. A third pivotal interconnection is provided for pivotally interconnecting the lever member to the link member for rotation about a lever pivot axis of rotation. An improved variable geometry linkage is provided in which at least one of the pivotal interconnections comprises a universal pivot joint for articulation of the link member with respect to the support plate and/or the lever member about mutually perpendicular axes to accommodate pitch and roll between the impact plate and the support plate.

43 Claims, 8 Drawing Sheets

VARIABLE GEOMETRY LINKAGE CONFIGURATION

CROSS-REFERENCE TO RELATED APPLICATIONS

This application is a continuation of pending PCT application PCT/US97/17625, filed Oct. 2, 1997, which claims the benefit of U.S. provisional application Ser. No. 60/027,348, filed Oct. 2, 1996.

BACKGROUND OF THE INVENTION

1. Field of the Invention

This invention relates to a mechanical configuration for a variable geometry damping system. In one of its aspects, the invention relates to a mechanical configuration having one or more universal joints.

2. Description of the Related Art

Conaway et al. in U.S. Pat. No. 5,253,853, disclose a variable dampening device for isolating a truck cab from the force vibration of a vehicle frame. The dampening suspension comprises a link member pivotably interconnected at one end to a support plate, a lever member pivotably interconnected at one end to a suspended impact plate and pivotably interconnected to a link member. A shock absorber is mounted to the impact plate and is pivotably connected to the lever member at a pivot axis spaced from the pivot connection with the link and with the impact plate. Air springs are mounted between the impact plate and support plate and a torque arm is pivotably interconnected between the impact plate and the support plate. Bushed rubber joints are disclosed for one or more of the pivot connections.

The variable geometry dampening system disclosed by Conaway et al. provides a non-linear mechanical transformation function between the input dampening resistance supplied by the shock absorber and the output force applied to the impact plate. There are very large levels of rotation compliance required of a majority of the system mechanical connections, exceeding the capabilities of conventional rubber bushing connections.

SUMMARY OF THE INVENTION

In one aspect, the invention relates to a variable geometry linkage configuration for use between a support structure and suspended body comprising a link member having first and second ends and a first pivotal interconnection for pivotally interconnecting said first end of the link member with a support plate for rotation about a support pivot axis of rotation. A lever member has a longitudinal axis and first and second ends as well as a second pivotal interconnection for pivotally interconnecting the first end of the lever member with the impact plate for rotation about a main pivot axis of rotation. A shock pivot is mounted to the lever member and is adapted to connect an end of a shock absorber to the lever member for rotation about a shock pivot axis of rotation. A third pivotal interconnection is provided for pivotally interconnecting the lever member to the link member for rotation about a lever pivot axis of rotation. According to the invention, at least one of the first and third pivotal interconnections is a universal pivot joint for articulation of the link member with respect to the support plate and/or the lever member about mutually perpendicular axes to accommodate pitch and roll between the impact plate and the support plate.

Both of the first and third pivotal interconnections preferably include a universal pivot joint for rotation of the link member about mutually perpendicular axes with respect to the support plate and the lever member. The pivotal interconnections can comprise roller bearings. The link member can be an H-shaped yoke having first and second ends each of which mounts a universal roller bearing assembly. The lever member can be U-shaped in configuration. The lever member preferably has a pair of spaced legs which are mounted to the link member through a universal joint. One of the legs can mount a bearing journal which forms a part of the second pivotal interconnection. In addition, one of the legs preferably mounts a shock absorber flange having a shaft for pivotably mounting the lever member to one end of the shock absorber. The bearing journal can removably mount a link at an outer end thereof for mounting the shock absorber to the lever member. The bearing journal preferably has an opening, and the link also has an opening in alignment with the opening in the bearing journal and a pin extends through the openings in the bearing journal and in the link to removably retain the link on the bearing journal. The bearing journal preferably mounts a low-friction bearing which forms a part of the second pivotal interconnection. At least one of the universal pivot joints preferably comprises a body with opposing journals which mount bearings which support the body for rotation about a pivot axis and a through-hole substantially perpendicular to the pivot axis of the bearings. The through-hole can mount needle bearings therein. The lever member preferably comprises a crank arm with the second end mounted to the universal pivot joint and the first end rotatably mounted to the second pivotal interconnection. The shock pivot preferably comprises a second crank arm mounted at a first end to the first end of the lever member and is adapted to pivotably mount the end of the shock absorber at a second end thereof.

In another aspect, the invention relates to a suspension system comprising a support plate adapted to be mounted to a support structure, an impact plate adapted to be mounted to a suspended body, and a variable geometry linkage configuration mounted therebetween for controlling the movement between the support structure and the suspended body. A link member has first and second ends. A first pivotal interconnection is provided for pivotally interconnecting the first end of the link member with a support plate for rotation about a support pivot axis of rotation. A lever member is provided which has a longitudinal axis and first and second ends. A second pivotal interconnection is provided for pivotally interconnecting said first end of said lever member with said impact plate for rotation about a main pivot axis of rotation. A shock pivot is mounted to the lever member and is adapted to connect an end of a shock absorber to the lever member for rotation about a shock pivot axis of rotation. A third pivotal interconnection is provided for pivotally interconnecting the lever member to the link member for rotation about a lever pivot axis of rotation. According to the invention, at least one of the first and third pivotal interconnections is a universal pivot joint for articulation of the link member with respect to the support plate and/or the lever member about mutually perpendicular axes to accommodate pitch and roll between the impact plate and the support plate.

Both of the first and third pivotal interconnections preferably include a universal pivot joint for rotation of the link member about mutually perpendicular axes with respect to the support plate and the lever member. The pivotal interconnections can comprise roller bearings. The link member can be an H-shaped yoke having first and second ends each of which mounts a universal roller bearing assembly. The lever member can be U-shaped in configuration. The lever member preferably has a pair of spaced legs which are mounted to the link member through a universal joint. One of the legs can mount a bearing journal which forms a part of the second pivotal interconnection. In addition, one of the legs preferably mounts a shock absorber flange having a shaft for pivotably mounting the lever member to one end of the shock absorber. The bearing journal can removably mount a ink at an outer end thereof for mounting the shock absorber to the lever member. The bearing journal preferably has an opening, and the link also has an opening in alignment with the opening in the bearing journal and a pin extends through the openings in the bearing journal and in the link to removably retain the link on the bearing journal. The bearing journal preferably mounts a low-friction bearing which forms a part of the second pivotal interconnection. At least one of the universal pivot joints preferably comprises a body with opposing journals which mount bearings which support the body for rotation about a pivot axis and a through-hole substantially perpendicular to the pivot axis of the bearings. The through-hole can mount needle bearings therein. The lever member preferably comprises a crank arm with the second end mounted to the universal pivot joint and the first end rotatably mounted to the second pivotal interconnection. The shock pivot preferably comprises a second crank arm mounted at a first end to the first end of the lever member and is adapted to pivotably mount the end of the shock absorber at a second end thereof.

BRIEF DESCRIPTION OF THE DRAWINGS

The invention will now be described with reference to the accompanying drawings in which.

DESCRIPTION OF THE PREFERRED EMBODIMENT

The variable geometry mechanism of this invention is used in the vibration damping device disclosed in U.S. Pat. No. 5,235,853, issued Oct. 19, 1993, which disclosure is incorporated herein by reference. According to this disclosure, a variable geometry mechanism is mounted between a support structure 12 and suspended body 14 to dampen the movement of the suspended body with respect to the support structure. To this end, a shock absorber (not shown) is pivotally connected at one end to either the support structure or the suspended body and extends essentially horizontally. The shock absorber is connected at another end to the variable geometry mechanism to non-linearly damp the movement of the suspended body with respect to the support structure. Typically, the suspended body will be supported on the support structure with conventional air springs, mechanical springs or a combination of the two. The mechanism is said to find particular use in damping the vibration of a vehicle with respect to a frame, and, in particular, a truck cab with respect to a truck frame. The mechanism may be able to dampen cab vibration with respect to a frame sufficiently so as to avoid the required special; eating for the vehicle operator.

Figure 1:
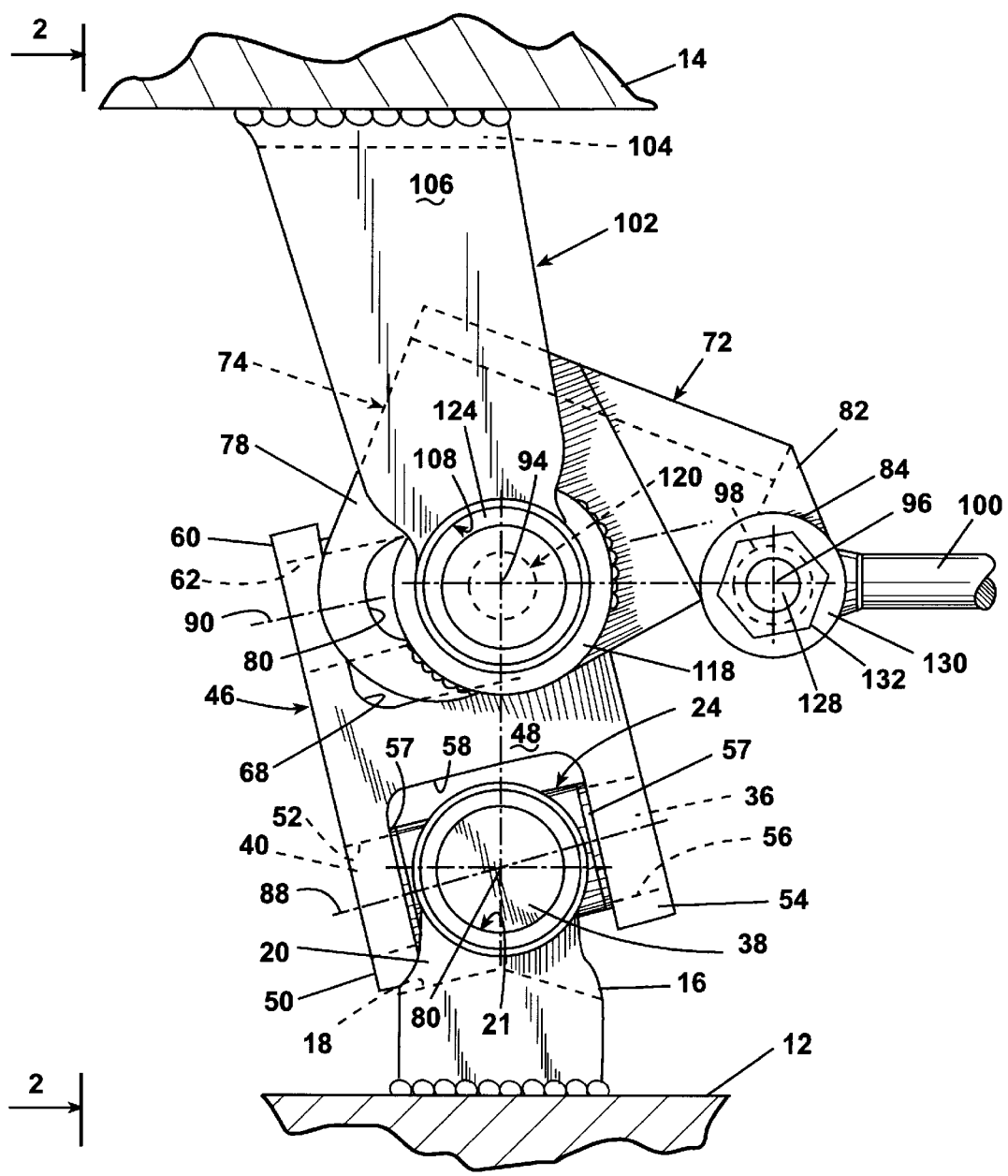
FIG. 1 is side elevational view of a linkage configuration according to the invention.
Figure 2:
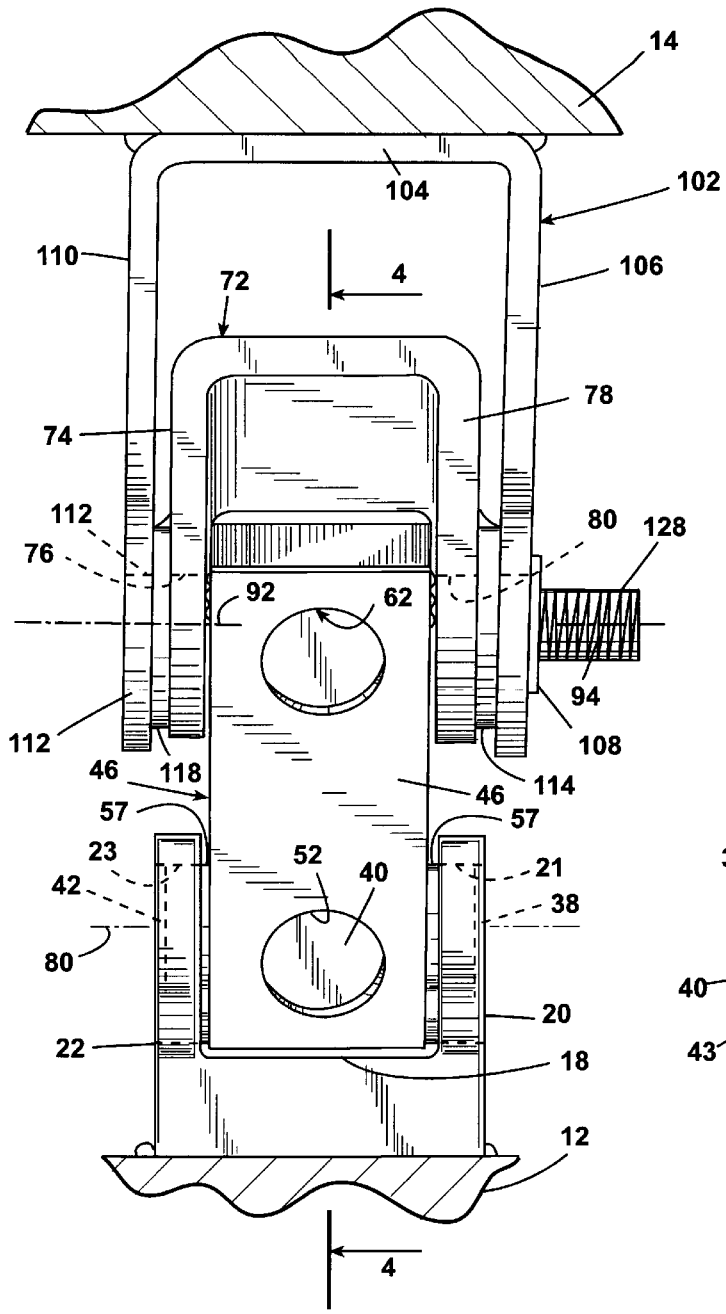
FIG. 2 is a view taken along lines 2—2 of FIG. 1.

Referring now to FIGS. 1 and 2, the variable geometry mechanism comprises the U-shaped support yoke (Roscommon Manufacturing Company—RMC P/N H-7) 16 having a base 18 secured to the support structure 12 and a pair of arms 20 and 22. An aperture 21 extends through arm 20 and an aperture 23 extends through arm 22. A cardan joint is mounted to the U-shaped support yoke 16 at the arcuate surfaces 21 and 23.

Figure 3:
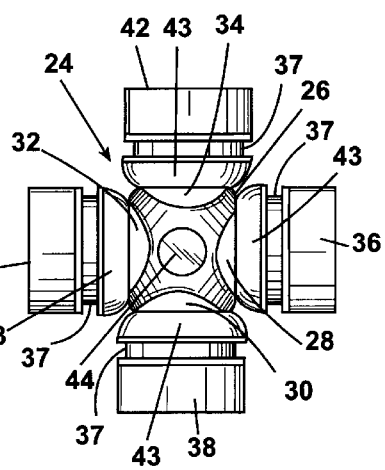
FIG. 3 is a plan view of a cardan joint used in the linkage configuration illustrated in FIGS. 1 and 2.

The cardan joint is illustrated in FIG. 3 to which reference is now made. The cardan joint is a conventional universal joint sold by Roscommon Manufacturing Company under the name R.M.C. P/N H-751. The cardan joint has a central support body 26 from which extend four equal legs 28, 30, 32 and 34. Removable bearing cups 36, 38, 40 and 42 are rotatably and removably mounted to legs 38, 30, 32 and 34, respectively. Each of the legs is a surface hardened and ground journal surface for supporting rolling element "needle bearings." Each of the bearing cups 36, 38, 40 and 42 has hardened ground interior surfaces which support the cylindrical needle roller bearings along an interior surface for relatively frictionless rotation of the bearings with respect to the respective journals on the legs. Each of the bearing cups further has an external ring groove 37 to receive a retainer ring. Elastomeric seals are installed at the journal entry openings to retain lubrication around the roller bearings and to exclude water and foreign particles. A screw 44 is threaded into a threaded opening in the central support body 26. The screw 44 seals an access opening to the interior of the central body 26 in which lubrication is placed for lubricating the bearings 36, 38, 40 and 42.

Figure 4:
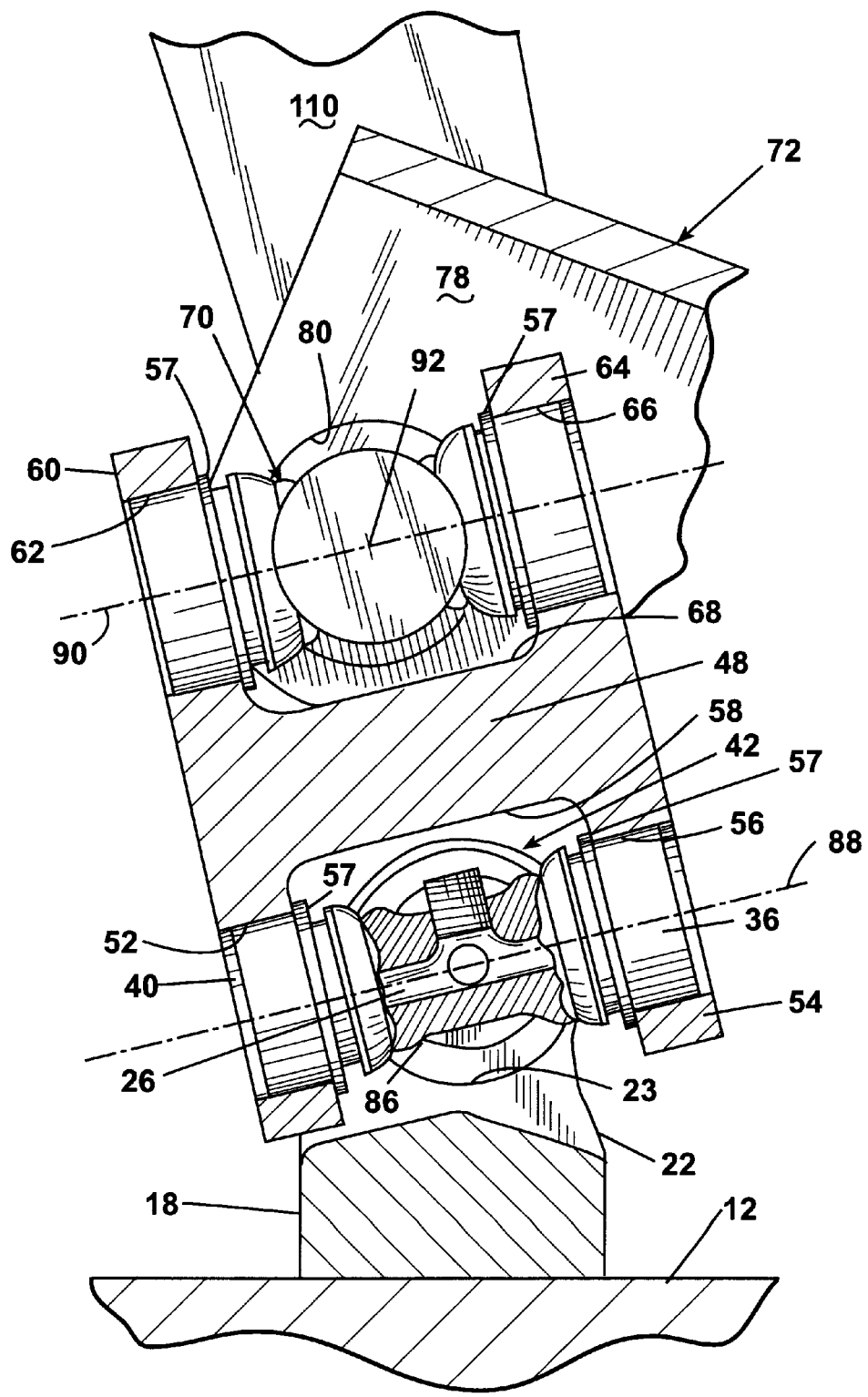
FIG. 4 is a partial cross-sectional view of the linkage configuration taken along lines 4—4 of FIG. 2.

Referring now to FIGS. 1, 2 and 4, an H-shaped yoke 46 (Spicer P/N 10-26-47) provides a link between the U-shaped support yoke 16 and a lever bracket 72. The H-shaped yoke has a central web 48 and four depending legs 50, 54, 60 and 64. The legs 50, 54, 60 and 64 have circular openings 52, 56, 62 and 56, respectively. The legs 50 and 54 form a U-shaped opening 58 in which the cardan joint 24 is mounted, and legs 60 and 64 form a U-shaped opening 68 in which a second cardan joint 70, identical with cardan joint 24, is mounted.

The cardan joint 24 is mounted to the U-shaped support yoke 16 at the arcuate surfaces 21 and 23 through the bearings 38 and 42. Typically, the bearings 38 and 42 are mechanically fastened to the arcuate surfaces 21 and 23 via internal retaining rings, 57. The H-shaped yoke 46 is pivotably mounted to the cardan joint 24 at the openings 56 and 52 through bearings 36 and 40 respectively. Typically, the bearings 36 and 40 are retained in the respective openings 56 and 52 through conventional snap rings 57. Thus, the H-shaped yoke 46 is mounted to the U-shaped support yoke 16 through a universal joint formed by the cardan joint 24. As a result, the H-shaped yoke 46 is mounted for pivotable movement with respect to the U-shaped support yoke 16 about a support pivot axis of rotation 86 and a transverse axis of rotation 88 with respect to the support pivot axis of rotation 86.

A lever bracket 72 is pivotably mounted to an upper end of the H-shaped yoke 46 through cardan joint 70 for rotation with respect to the H-shaped yoke 46 about a transverse axis of rotation 90 and a lever pivot axis of rotation 92. To this end, the cardan joint 70 has bearings which are mounted in the openings 62 and 66 of the H-shaped yoke 46. The bearings are retained in the openings 62 and 66 by snap ring 57. The lever bracket 72 is U-shaped in configuration having depending legs 74 and 78 with aligned openings 76 and 80, respectively. The cardan joint 70 has bearings which are received in the openings 76 and 80 of the lever bracket 72, thereby pivotably mounting the lever bracket 72 for rotational movement with respect to the H-shaped yoke 46 about the lever pivot axis of rotation 92. The bearings are retained in the openings 76 and 80 through conventional snap rings 57 which fit within the ring grooves 37 (FIG. 3).

Figure 5:
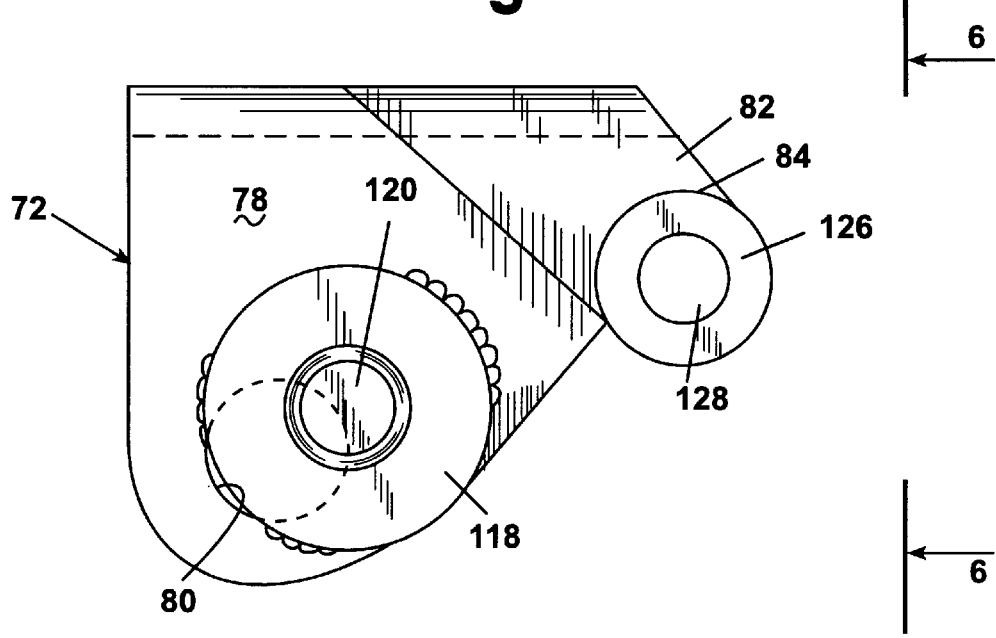
FIG. 5 is a side elevational view of a lever bracket illustrated in FIGS. 1, 2 and 4.
Figure 6:
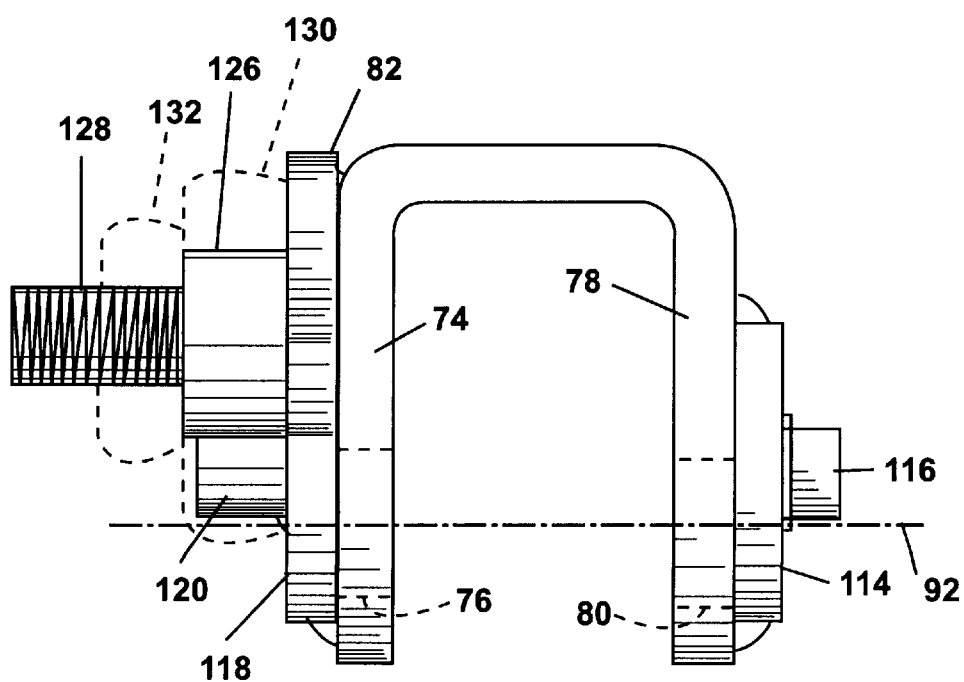
FIG. 6 is a front elevational view of the lever bracket illustrated in FIG. 5.

A U-shaped bracket 102 is secured to the suspended body 14 through a bite portion 104, typically by welding. The bracket 102 has depending legs 106 and 110 with openings 108 and 112, respectively. As shown in FIGS. 5 and 6, a flange 114 having a bearing journal 116 is attached to the outer surface of the leg 78 and a flange 118 having a bearing journal 120 is mounted to the outer surface of the leg 74, preferably by welding. A bearing cup 122 is mounted to the bearing journal 116 and a bearing cup 124 is mounted to the bearing journal 120 for rotation with respect thereto. The bearings 122, 124 are retained on the journals 116, 120 by snap rings 57. The leg 106 mounts the bearing cup 124 in the opening 108. In like manner, the leg 110 mounts the bearing 124 in the opening 112. The bearings 122 and 124 are retained in the legs 106 and 110 by snap ring 57.

Typically, the flanges 114 and 118 of the bearing journals 116 and 120 are dowel located to legs 78 and 74 to establish alignment, then permanently attached to the legs 78 and 74 by welding of the flanges 114 and 118 to legs 78 and 74, respectively.

As shown more clearly in FIGS. 5 and 6, a shock absorber flange 82 having an arcuate surface 84 is secured to the outer surface of the flange 74, preferably by welding. The flange 82 mounts a shock absorber bearing 126 having a threaded shaft 128, preferably by welding. A bearing 130, shown in phantom lines in FIG. 6, is mounted on the bearing 126 and secured thereon by a nut 132 (shown in phantom lines in FIG. 6). A free end 100 of a shock absorber is rigidly mounted to the shock bearing 130.

Figure 7:
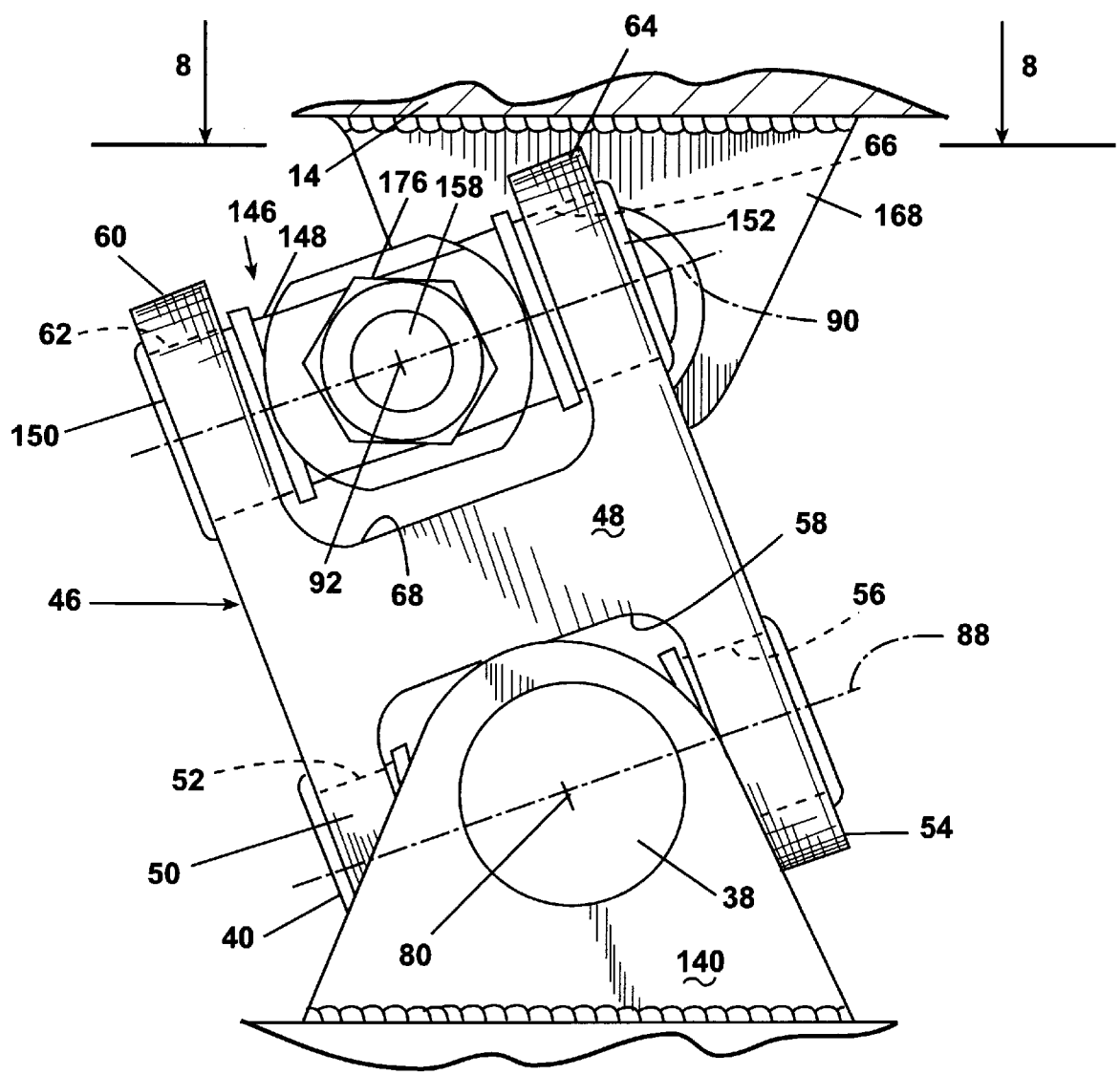
FIG. 7 is a schematic side elevational view of an alternate variable geometry mechanism according to the invention.
Figure 8:
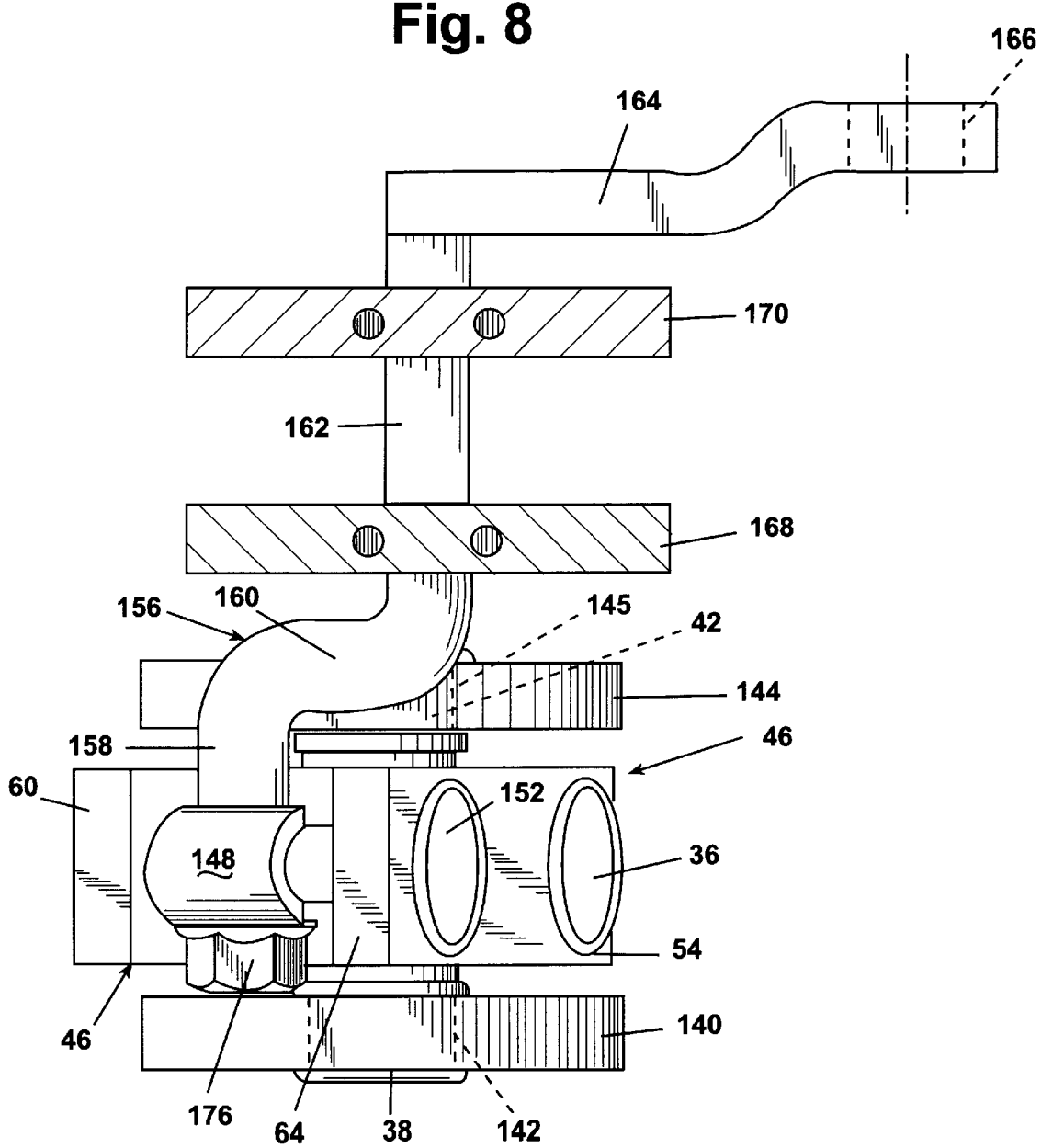
FIG. 8 is a top elevational view of the variable geometry mechanism illustrated in FIG. 7.

Referring now to FIGS. 7 and 8, there is shown a second embodiment of the invention wherein like numerals have been used to designate like parts. Bearing supports 140 and 144 have through holes 142 and 145 respectively for mounting bearings 38 and 42. The bearings 38 and 42 form a part of a cardan joint 24 having the same structure as the cardan joint 24 disclosed above with respect to the first embodiment.

Bearings 40 and 36 of the cardan joint 24 mount an H-shaped yoke 46 for rotation about an axis of rotation 80 on bearings 38 and 42. The yoke 46 is also rotatable about the axis of rotation 88 on bearings 36 and 40. The upper portion of the H-shaped yoke 46 mounts a half-cross link member 146 having bearings 150 and 152 which are mounted in openings 62 and 66, respectively, of the H-shaped yoke 46.

Figure 12:
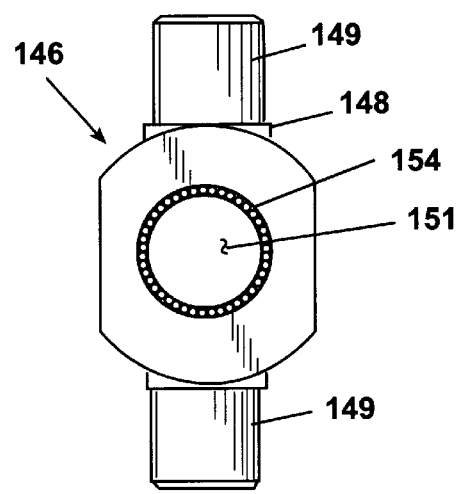
FIG. 12 is a top plan view of the half-cross member illustrated in FIGS. 7 and 8.
Figure 13:
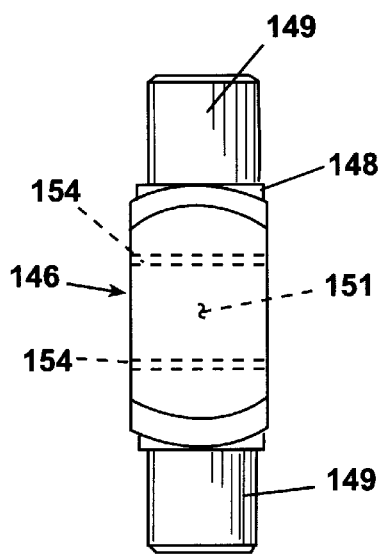
FIG. 13 is a front elevational view of the half-cross member illustrated in FIG. 12.
Figure 14:
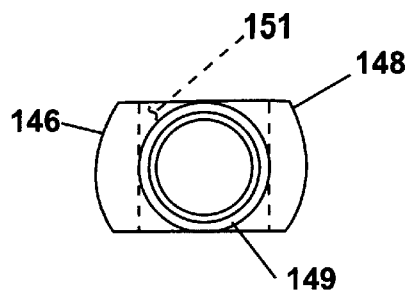
FIG. 14 is a side elevational view of the half-cross member illustrated in FIG. 12.

As shown in FIGS. 7–8 and in greater detail in FIGS. 12–14, the half-cross link member 146 has a body 148 with bearing arms 149 extending laterally for rotationally supporting the bearings 150 and 152. The body 148 also has a through hole 151 in which an end 158 of a crank 156 is received. The a through hole 151 has needle bearings 154 provided around a circumferential surface thereof. The end 158 is threaded and receives a nut 176 to secure the crank 158 to the body 148. The crank 156 has a lateral section 160 and an axial section 162 forming the crank configuration. The axial section 162 is mounted to a suspended body through a pair of journal mounts 168 and 170, each having a roller bearing. A crank arm 164 is rigidly mounted to the end of the axial section 162 of the crank 156 for rotational movement with the crank 156. The crank arm 164 has an opening 166 in which is mounted a bearing (not shown) for mounting a free end of a shock absorber (not shown).

Figure 9:
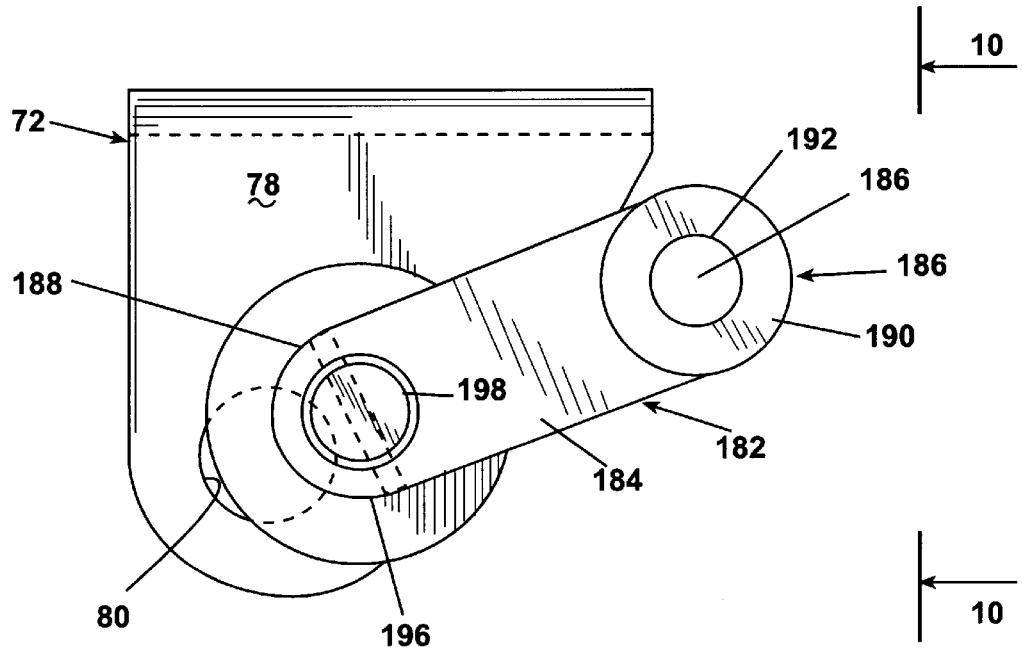
FIG. 9 is a side elevational view of another embodiment of the lever bracket illustrated in FIG. 6.
Figure 10:
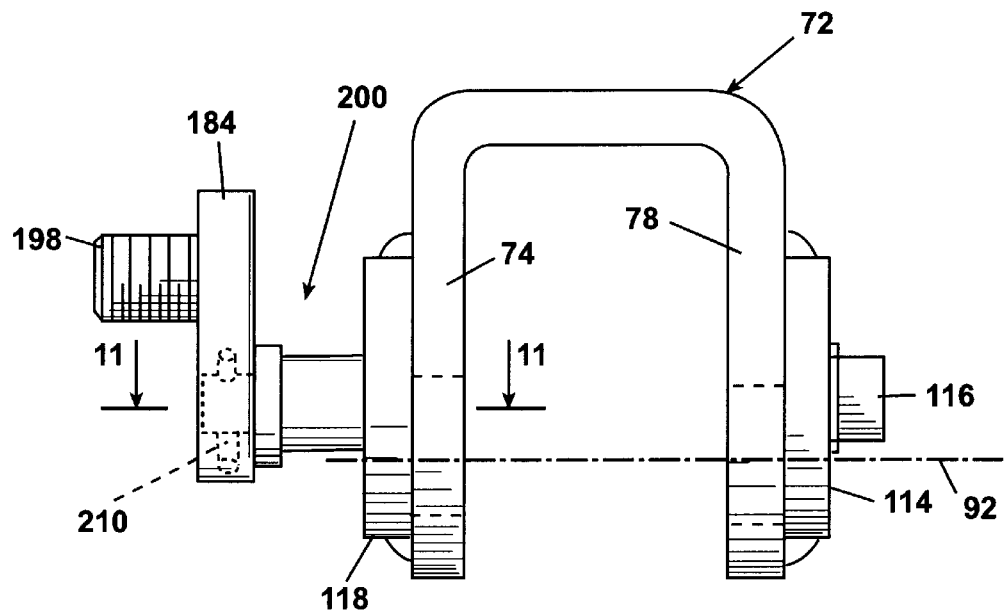
FIG. 10 is a front elevational view of the lever bracket illustrated in FIG. 9.

FIGS. 9 and 10 show another lever bracket assembly shown in FIGS. 5 and 6 in which like numerals have been used to designate like parts in FIGS. 9–10.

A modified lever bracket assembly 182 comprises an elongated link 184 having a first end 186 and a second end 188. The first end 186 of the link 184 has an arcuate surface 190 thereon which mounts a shock absorber bearing 192 having a threaded shaft 194. The threaded shaft 194 can be supported by a bearing (not shown) as in the previous embodiment of the shock absorber bearing shown in FIGS. 5–6. A free end of a shock absorber can be mounted to the bearing as before.

The second end 188 of the link 184 has an arcuate surface 196 which is provided with a mounting journal 198 therein which is adapted to be removably mounted to the bearing flange 118 of the lever bracket 72 through an elongated journal 200.

Figure 11:
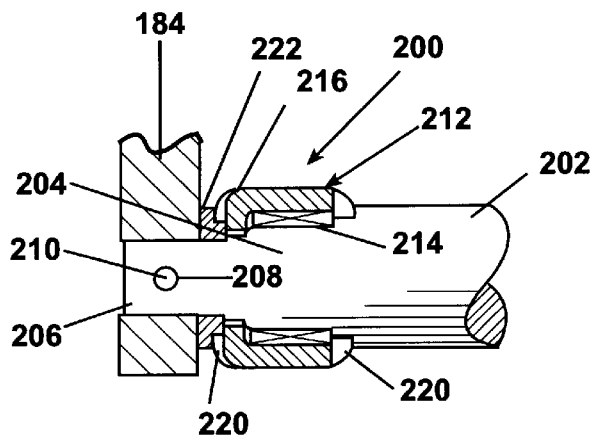
FIG. 11 is a cross-sectional view of the lever bracket illustrated in FIG. 10 taken along lines 11—11 of FIG. 10.

The elongated journal 200, shown in FIG. 10 and in greater detail in FIG. 11, comprises a cylindrical shaft 202 having one end provided with a reduced-diameter portion 204 thereon. The reduced-diameter portion 204 terminates in a rectangular protrusion 206 which is provided with a bore 208 having a spring-loaded pin 210 which extends therethrough. The reduced-diameter portion 204 is enclosed in a bearing cup 212 which contains "needle" rolling element bearings 214 that allow the shaft 202 to turn with negligible friction on support bearing cup 212. Sealing rings 220 are provided at either end of the shell 216 to eliminate foreign contaminants. A spacer ring 222 is provided adjacent one end of the shell 216 to provide clearance between the bearing cup 212 and an adjacent component, and provide a sealing surface for.

The bearing cup 212 and the elongated journal 200 cooperate to removably mount the shock absorber flange to the lever bracket 72. An end of the journal 200 is mounted within the bearing 118 of the lever bracket 72 while the e nd of the journal 200 having the rectangular protrusion 206 is inserted within the journal 198 at the second end 188 of the shock absorber flange 182. The spring-loaded pin 210 of the elongated journal 200 can cooperate with recesses (not shown) in the journal 198 to removably secure the shock absorber flange thereto. The spring-loaded pin 210 can be retracted within the bore 208 to remove the link 184 from the journal 200. The linkage operates as described in the previous embodiment.

Reasonable variation and modification are possible within the scope of the foregoing disclosure and drawings without departing from the spirit of the invention.

I claim:

1. In a variable geometry linkage configuration for use between a support structure and suspended body comprising:
   a link member having first and second ends;
   a first pivotal interconnection for pivotally interconnecting said first end of said link member with a first element which is adapted to be connected to one of the support structure and the suspended body for rotation of the first end of the link member about a support pivot axis of rotation;
   a lever member having a longitudinal axis and first and second ends;
   a second pivotal interconnection for pivotally interconnecting said first end of said lever member with a second element which is adapted to be connected to the other of the support structure and the suspended body for rotation about a main pivot axis of rotation;
   a shock pivot mounted to the lever member and adapted to connect an end of a shock absorber to the lever member for rotation about a shock pivot axis of rotation;
   a third pivotal interconnection for pivotally interconnecting the lever member to the link member for rotation about a lever pivot axis of rotation;
   the improvement which comprises:
      at least one of the first and third pivotal interconnections comprises a universal pivot joint for articulation of the link member with respect to the support plate and/or the lever member about mutually perpendicular axes to accommodate pitch and roll between the impact plate and the support plate.

2. The variable geometry linkage of claim 1 wherein both of the first and third pivotal interconnections include a universal pivot joint for rotation of the link member about mutually perpendicular axes with respect to the support plate and the lever member.

3. The variable geometry linkage of claim 2 wherein the pivotal interconnections comprise roller bearings.

4. The variable geometry linkage according to claim 2 wherein the link member is an H-shaped yoke having first and second ends, each of which mounts a universal roller bearing assembly.

5. The variable geometry linkage of claim 4 wherein the lever member is U-shaped in configuration.

6. The variable geometry linkage of claim 5 wherein the lever member has a pair of spaced legs which are mounted to the link member through a universal joint.

7. The variable geometry linkage of claim 6 wherein one of the legs of the lever member mounts a shock absorber flange having a bearing for pivotably mounting the lever member to one end of the shock absorber.

8. The variable geometry linkage of claim 6 wherein one of the legs of the lever member mounts a bearing journal which forms a part of the second pivotal interconnection.

9. The variable geometry linkage of claim 8 wherein the bearing journal removably mounts a link at an outer end thereof for mounting the shock absorber to the lever member.

10. The variable geometry linkage of claim 9 wherein the bearing journal has an opening, and the link also has an opening in alignment with the opening in the bearing journal and a pin extends through the openings in the bearing journal and in the link to removably retain the link on the bearing journal.

11. The variable geometry linkage of claim 8 wherein the bearing journal mounts a low-friction bearing which forms a part of the second pivotal interconnection.

12. The variable geometry linkage of claim 4 wherein it least one of the universal pivot joints comprises a body with opposing journals which mount bearings which support the body for rotation about a bearing pivot axis and openings in the body substantially perpendicular to the pivot axis of the bearings.

13. The variable geometry linkage of claim 12 wherein the openings mount needle bearings therein.

14. The variable geometry linkage of claim 12 wherein the lever member comprises a crank arm.

15. The variable geometry linkage of claim 14 wherein the shock pivot comprises a second crank arm mounted at a first end to the first end of the lever member and is adapted to pivotably mount the end of the shock absorber at a second end thereof.

16. The variable geometry linkage of claim 1 wherein the pivotal interconnections comprise roller bearings.

17. The variable geometry linkage according to claim 1 wherein the link member is an H-shaped yoke having first and second ends, each of which mounts a universal roller bearing assembly.

18. The variable geometry linkage of claim 1 wherein the lever member is U-shaped in configuration.

19. The variable geometry linkage of claim 1 wherein the lever member has a pair of spaced legs which are mounted to the link member through a universal joint.

20. The variable geometry linkage of claim 19 wherein one of the legs of the lever member mounts a shock absorber flange having a bearing for pivotably mounting the lever member to one end of the shock absorber.

21. The variable geometry linkage of claim 19 wherein one of the legs of the lever member mounts a bearing journal which forms a part of the second pivotal interconnection.

22. The variable geometry linkage of claim 21 wherein the bearing journal removably mounts a link at an outer end thereof for mounting the shock absorber to the lever member.

23. The variable geometry linkage of claim 22 wherein the bearing journal has an opening, and the link also has an opening in alignment with the opening in the bearing journal and a pin extends through the openings in the bearing journal and in the link to removably retain the link on the bearing journal.

24. The variable geometry linkage of claim 21 wherein the bearing journal mounts a low-friction bearing which forms a part of the second pivotal interconnection.

25. The variable geometry linkage of claim 1 wherein at least one of the universal pivot joints comprises a body with opposing journals which mount bearings which support the body for rotation about a bearing pivot axis and openings in the body substantially perpendicular to the pivot axis of the bearings.

26. The variable geometry linkage of claim 25 wherein the openings mount needle bearings therein.

27. The variable geometry linkage of claim 25 wherein the lever member comprises a crank arm.

28. The variable geometry linkage of claim 27 wherein the shock pivot comprises a second crank arm mounted at a first end to the first end of the lever member and is adapted to pivotably mount the end of the shock absorber at a second end thereof.

29. A suspension system comprising a support plate adapted to be mounted to one of a support structure and a suspended body, an impact plate adapted to be mounted to the other of the support structure and the suspended body, and a variable geometry linkage configuration mounted therebetween for controlling the movement between the support structure and the suspended body comprising:

a link member having first and second ends;

a first pivotal interconnection for pivotally interconnecting said first end of said link member with a first element which is adapted to be connected to the support plate for rotation of the first end of the link member about a support pivot axis of rotation;

a lever member having a longitudinal axis and first and second ends;

a second pivotal interconnection for pivotally interconnecting said first end of said lever member with a second element which is adapted to be connected to said impact plate for rotation about a main pivot axis of rotation;

a shock pivot mounted to the lever member and adapted to connect an end of a shock absorber to the lever member for rotation about a shock pivot axis of rotation;

a third pivotal interconnection for pivotally interconnecting the lever member to the link member for rotation about a lever pivot axis of rotation;

the improvement which comprises:

at least one of the first and third pivotal interconnections comprises a universal pivot joint for articulation of the link member with respect to the support plate and/or the lever member about mutually perpendicular axes to accommodate pitch and roll between the impact plate and the support plate.

30. The suspension system of claim 16 wherein both of the first and third pivotal interconnections include a universal pivot joint for articulation of the link member about mutually perpendicular axes with respect to the support plate and the lever member.

31. The suspension system of claim 30 wherein the first and third pivotal interconnections comprise roller bearings.

32. The suspension system of claim 30 wherein the link member is an H-shaped yoke having first and second ends each of which mounts a universal roller bearing assembly.

33. The suspension system of claim 30 wherein the lever member is U-shaped in configuration.

34. The suspension system of claim 30 wherein the lever member has a pair of opposed legs which are adapted to be mounted to the link member through a universal joint.

35. The suspension system of claim 34 wherein one of the legs of the lever mounts a bearing journal which forms a part of the second pivotable interconnection.

36. The suspension system of claim 34 wherein one of the legs of the lever mounts a shock absorber flange having a bearing for pivotably mounting the lever member to one end of the shock absorber.

37. The suspension system of claim 35 wherein the bearing journal removably mounts a link at an outer end thereof for mounting the shock absorber to the lever member.

38. The suspension system of claim 37 wherein the bearing journal has an opening, and the link also has an opening in alignment with the opening in the bearing journal and a pin extends through the openings in the bearing journal and in the link to removably retain the link on the bearing journal.

39. The suspension system of claim 37 wherein the bearing journal mounts a low-friction bearing which forms a part of the second pivotal interconnection.

40. The suspension system of claim 29 wherein at least one of the universal pivot joints comprises a body with opposing journals which mount bearings which support the body for rotation about a bearing pivot axis and openings in the body substantially perpendicular to the pivot axis of the bearings.

41. The suspension system of claim 40 wherein the openings in the body mount needle bearings therein.

42. The suspension system of claim 29 wherein the lever member comprises a crank arm.

43. The suspension system of claim 42 wherein the shock pivot comprises a second crank arm mounted at a first end to the first end of the lever member and is adapted to pivotably mount the end of the shock absorber at a second end thereof.

* * * * *